United States Patent [19]

Schultz

[11] 4,078,457
[45] Mar. 14, 1978

[54] METHOD OF GRINDING CONCAVE RAKING SURFACES OF BLADE OF CIRCULAR SAW

[75] Inventor: Robert M. Schultz, Jersey City, N.J.

[73] Assignee: Luxite Corporation, Jersey City, N.J.

[21] Appl. No.: 784,535

[22] Filed: Apr. 4, 1977

Related U.S. Application Data

[63] Continuation-in-part of Ser. No. 595,172, Jul. 11, 1975, abandoned.

[51] Int. Cl.$^2$ .......................... B23D 63/14; B24B 1/00
[52] U.S. Cl. ........................................ 76/112; 51/288
[58] Field of Search ................. 76/101 R, 101 A, 112, 76/40, 41, 37; 51/288; 83/853

[56] References Cited

U.S. PATENT DOCUMENTS

| 192,090 | 6/1877 | Spaulding | 83/853 |
|---|---|---|---|
| 1,771,602 | 7/1930 | Armstrong | 76/41 |
| 3,362,446 | 1/1968 | Potomak | 83/853 |
| 3,616,711 | 11/1971 | Daggett | 76/40 X |
| 3,766,806 | 10/1973 | Benner | 76/37 X |
| 3,964,349 | 6/1976 | Von Arnauld | 76/112 X |

FOREIGN PATENT DOCUMENTS

| 617,560 | 4/1961 | Canada | 76/112 |

Primary Examiner—Al Lawrence Smith
Assistant Examiner—Nicholas P. Godici
Attorney, Agent, or Firm—Mel K. Silverman; David A. Jackson

[57] ABSTRACT

The present novel inventive method of grinding the raking surfaces of a blade of a circular saw includes the steps of positioning a rotating frustoconical grinding element in two-directional movable relationship to a fixed plane of reference such as a work bench; positioning the major plane of the circular saw in a position which will permit a tangential approach of the frustoconical grinding element to the raking surfaces of the blade; moving the grinding element into abutment with the raking surface of one tooth of the circular saw; pressing the outer surface of said rotating grinding element against said raking surface; utilizing manual pressure in order to obtain a concave surface having a progression of change of radius in which the tangent angle of said change of radius is between two and ten degrees and abrading said raking surface so as to form a concave configuration therein having a graduated depth terminating at a maximum of 1/32 of an inch measured in relation to lateral, radially directed leading edges of said tooth, said maximum depth defined at the outermost end thereof.

4 Claims, 14 Drawing Figures

METHOD OF GRINDING CONCAVE RAKING SURFACES OF BLADE OF CIRCULAR SAW

CROSS-REFERENCE TO RELATED APPLICATIONS

The present application is a Continuation-In-Part of copending Ser. No. 595,172, filed July 11, 1975, now abandoned, which is in turn related to Ser. No. 595,173 filed July 11, 1975 and now U.S. Pat. No. 3,986,421, issued Oct. 19, 1976, all by the inventor herein.

BACKGROUND OF THE INVENTION

Certain prior art efforts have seen the use of circular grinding elements in order to effectuate the sharpening of the surfaces of particular mechanical tools. For example, the patent to Rochet, U.S. Pat. No. 3,626,645, illustrates the use of a cup-shaped grinding wheel in order to sharpen the edges of a twist drill. Thus, Rochet, like much of the prior art in the area, pertains solely to techniques for the sharpening of drills and drill bits.

In like regard, the patent to Lundin, U.S. Pat. No. 3,201,903, discloses a method of sharpening rock drill bits in which one face of the drill is ground while the grinding element overlaps a second face of the drill. Said patent further involves the use of electrolytic grinding concepts and, as such, represents a sophisticated, but yet complicated and somewhat expensive, approach to the problem of reconstituting dulled cutting edges.

Further shown in the prior art is a method of truing teeth of machinery utilized in order to form the teeth of the gears of certain types of machinery. The surfaces of said teeth comprise flat surfaces. Accordingly, said patent does not touch upon the more difficult problem of the sharpening of raking surfaces which are essentially concave in nature.

Another prior art effort relating to the general area appears in the patent to Wildhaber, U.S. Pat. No. 2,332,420, in which a cylindrical grinding element is utilized in order to sharpen essentially flat raking surfaces.

Thus, to the best knowledge of the Inventor, the prior art has not shown any practical means or method by which a concave raking surface of a circular saw may be readily formed or reconstituted. Accordingly, this observation has given rise to the present inventive activity.

SUMMARY OF THE INVENTION

The present novel inventive method of grinding the raking surfaces of a blade of a circular saw includes the steps of positioning a rotating frustoconical grinding element in two-directional movable relationship to a fixed plane of reference such as a work bench; positioning the major plane of the circular saw in a position which will permit a tangential approach of the frustoconical grinding element to the raking surfaces of the blade; moving the grinding element into abutment with the raking surface of one tooth of the circular saw; pressing the outer surface of said rotating grinding element against said raking surface; utilizing manual pressure in order to obtain a concave surface having a progression of change of radius in which the tangent angle of said change of radius is between 2° and 10° and abrading said raking surface so as to form a concave configuration therein having a graduated depth terminating at a maximum of 1/32 of an inch measured in relation to lateral, radially directed leading edges of said tooth, said maximum depth defined at the outermost end thereof.

The method of our invention has as its characterizing feature the efficient, rapid reconstitution of sawteeth by the differential resurfacing of the lateral and central surfaces of the individual teeth to account for variations in stress and wear during use of the saw blades. The apparatus employed in the method of the present invention is of such simplicity as to facilitate the rapid operation of the method particularly with respect to circular saw blades having a plurality of such teeth.

It is the object of the present invention to provide a simple and practical method by which the raking or cutting surfaces of the blade of a circular saw may be readily reconstituted.

It is another object of the present invention to provide a method of grinding flat cutting surfaces of a circular blade in order to create a new raking surface having a greater efficiency of function than the pre-existing surface, said efficiency being measured primarily in terms of chip-free cutting characteristics.

It is a yet further object of the present invention to provide a method of grinding the raking surfaces of a circular blade which will produce a new type of raking surface superior in performance to heretofore known raking surfaces of its class.

DETAILED DESCRIPTION OF THE INVENTION

A proper understanding of the present invention must begin with a clear view of the type of saw and associated cutting teeth which have, heretofore, projected difficulties in the constitution of the surfaces thereof.

Figure 1:
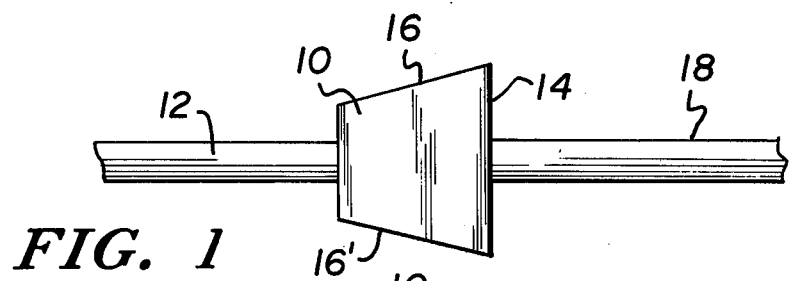
FIG. 1 is a top plan view of one type of saw tooth to which the present inventive method is applicable.
Figure 2:
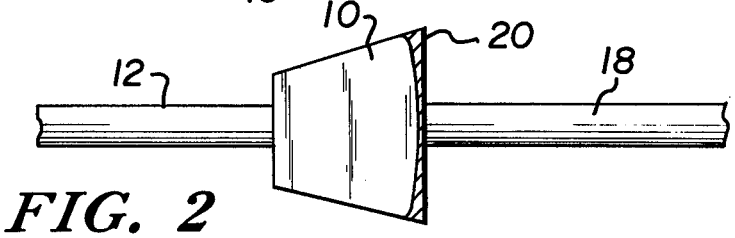
FIG. 2 is a top plan view, similar to FIG. 1, however showing, in shaded area, the nature of the wear phenomenon experienced by the raking surface over extended usage.
Figure 3:
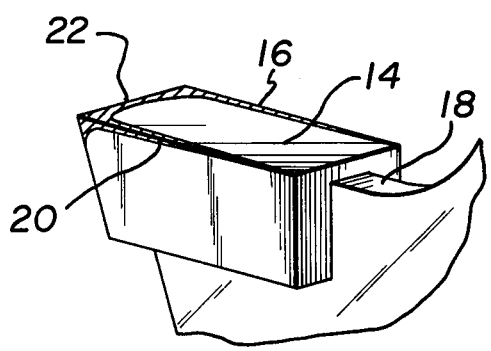
FIG. 3 is a perspective view of a circular blade showing, in shaded area, the appearance of the wear phenomenon.

In this regard, one's attention is directed to FIG. 1 in which a top plan view of a typical tooth 10 of a circular blade 12 is shown. It is noted that the tooth 10 comprises a raking surface 14 as well as a pair of lateral cutting edges 16 and 16'. Immediately in front of the raking surface 14 is a curved area, popularly known as a gullet and hereinafter denoted as gullet 18. As the tooth 10 is repeatedly used, it experiences a type of wear phenomenon which is peculiar to blades of circular saws having flat raking surfaces. The configuration of this wear phenomenon 20 is shown in top plan view, in shaded area, in FIG. 2. Also, the vertical extent of the wear 20 is shown in perspective view in FIG. 3. It is noted that the horizontal extent of said wear will generally approximate 3 mils, while the vertical extent of the wear is generally in the neighborhood of 10 to 15 mils. Understandably, the greatest wear appears at the top edge 22 of the raking surface 14. Also, substantial wear occurs at the edges 16 and 16' of said raking surface.

The present inventive method, which is intended, among other objects, as a solution to the above problem, involves the use of a frustoconical grinding element positioned in suitable movable relationship to the major plane of a circular saw 23, the teeth of which are to be sharpened. Such an arrangement is, in schematic view, shown in FIG. 4. In this figure the bi-directional mutual relationship of the grnding element 24 and the saw 23 is shown.

Figure 4:
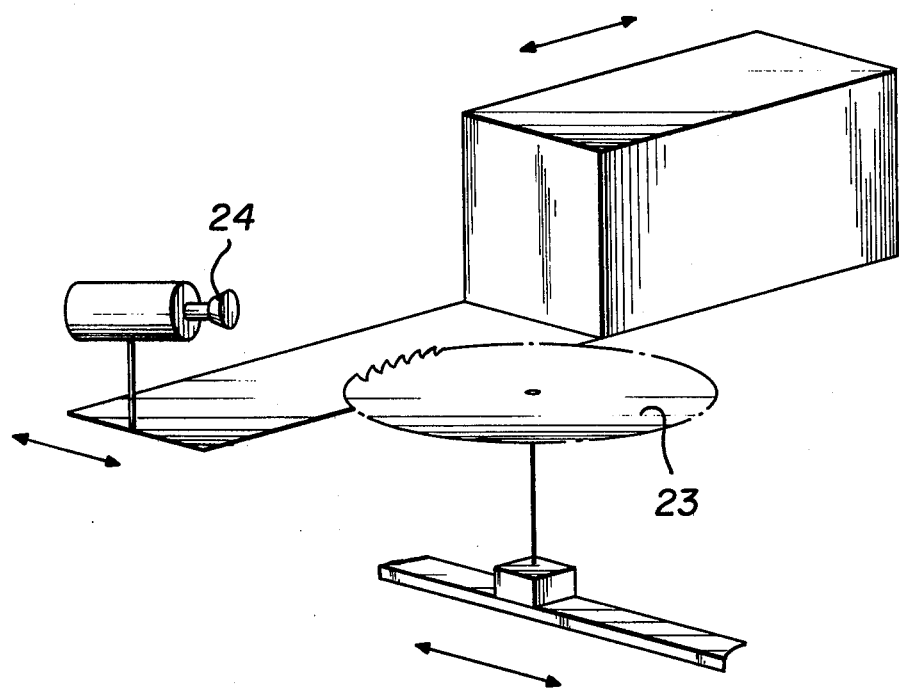
FIG. 4 is a perspective schematic view showing the initial positioning of the frustoconical grinding element with respect to the saw blade.
Figure 5:
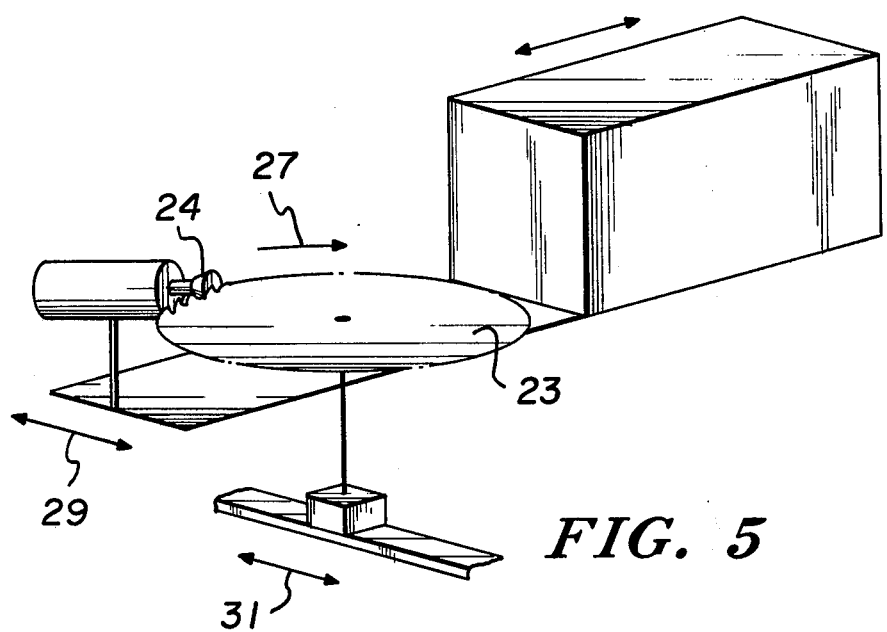
FIG. 5 is a perspective schematic view showing the frustoconical grinding element as it approaches the raking surface of a tooth of the circular saw blade.

Through the use of the arrangement of FIG. 4, a desired approach by the grinding element to a raking surface of a tooth of the blade may be made. This is schematically shown in FIG. 5 and, in greater detail, in FIG. 6 in which the actual physical inter-relationship between the rotating outer surface of the grinding element 24 and the tooth 10 is shown.

Figure 8:
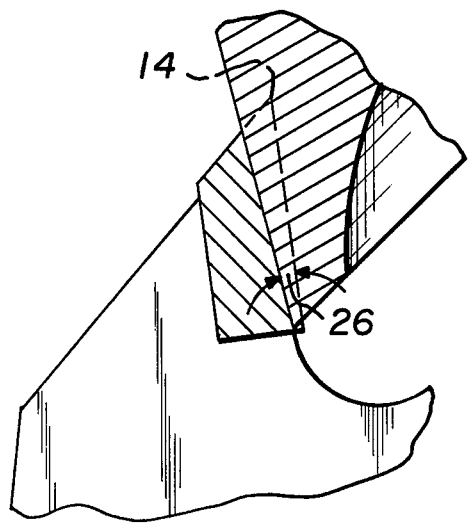
FIG. 8 is a magnified schematic view of the interface between the grinding surface and the raking surface, showing the extent of penetration by the grinding surface of the heretofore worn raking surface, as well as the respective radial tangent angle of said surfaces.

It is to be noted that the surface of grinding element 24 is positioned so as to coincide the desired raking surface 14. However, it is also noted that a slight angular displacement of the grinding element 24 with respect to the pre-existing raking surface is formed. This angular displacement, denoted as reference numeral 26 in FIG. 8, is on the order of between 2° and 10° and, thereby, will produce a concave surface of a graduated, progressively increasing depth terminating at a maximum depth of 1/32 of an inch as measured at the outermost edge of raking surface 14 with respect to the radially directed lateral cutting edges 16 and 16'. This measurement is also illustrated with respect to FIG. 11 wherein the linear perpendicular distance between edge 16' and the concavity of the tooth represented in phantom are seen to be linearly displaced from each other. A distance which, in accordance with the present invention, would comprise a maximum of 1/32 of an inch as measured with respect to the outermost end 34 of the tooth.

Figure 9:
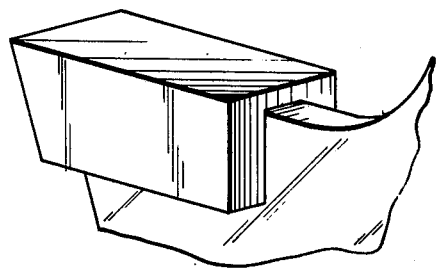
FIG. 9 is a perspective view of a saw tooth prior to its treatment by the present inventive method.
Figure 10:
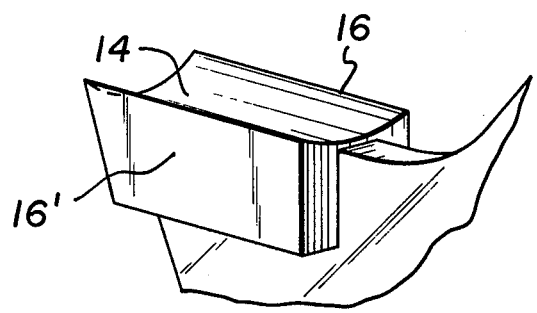
FIG. 10 is a perspective view, similar to FIG. 9, however showing the appearance of the raking surface of a tooth after it has been ground by the present method.

The above described concave surface is likewise illustrated by a comparison of FIG. 10, showing the appearance of the raking surface of a tooth after it has been ground, with FIG. 9 showing the appearance of a raking surface prior to its constitution via the present method.

Figure 6:
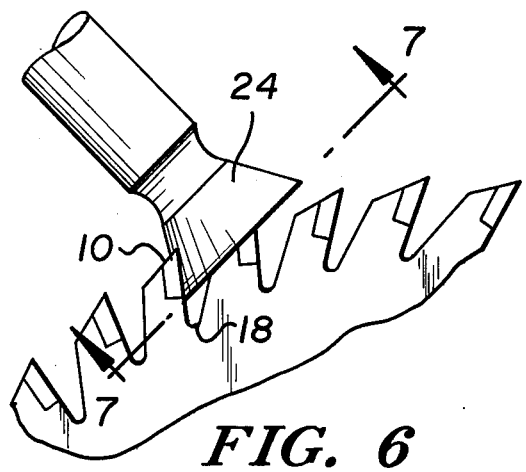
FIG. 6 is an enlarged side schematic view of the frustoconical element engaged in rotational contact with the raking surface of a saw tooth.
Figure 7:
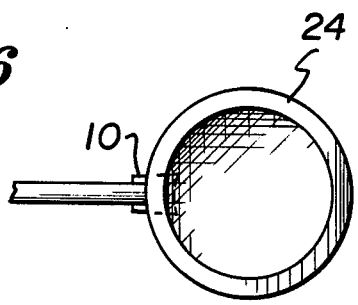
FIG. 7 is a bottom cross-sectional schematic view taken along line 7—7 of FIG. 6.

It is noted that the angular rotation of the grinding element 24, which is illustrated in FIG. 6, is effectuated through the application of manual pressure. In other words, it is not necessary to utilize sophisticated control machinery in order to effectuate the necessary grinding process. Rather, a common machinist using a combination of moderate muscle pressure and a continued visual observation in order to attain the abovementioned 1/32 of an inch curvature, can easily practice the present inventive method.

In the alternative to the above described operation, the present inventive method may be practiced through the implementation of automatic machine controls. For example, an automatic indexing assist may be used, within the arrangement of FIGS. 4 and 5, in order to advance the blade, on a tooth by tooth basis, in the direction indicated by arrow 27.

Further, a fully automatic grinding operation may be obtained in which, in addition to the use of the above indexing assist, the approach of the grinding element 24 to the saw 23, shown in FIGS. 5 and 6, is controlled by an automatic machine control process known as plunge grinding. In such a fully automatized operation, the movements indicated by arrows 29 and 31 in FIG. 5 are controlled. Further, a fine control is utilized in order to attain the desired degree of position in the tangential approach to the raking surface indicated by angle 26 in FIG. 8.

The concave surface obtained through the use of the above described method is believed to be unique in the art, and, accordingly, comprises the subject of our issued U.S. Pat. No. 3,986,421, referenced above, the disclosure of which is incorporated herein by reference.

Figure 11:
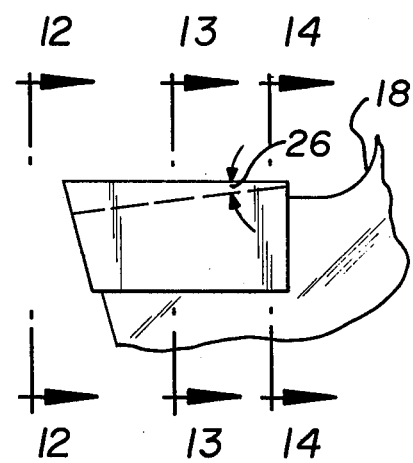
FIG. 11 is a side schematic view of FIG. 10 illustrating the nature of the inverse half-conical form imparted to the raking surface.
Figure 12:
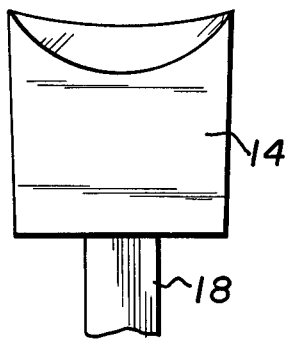
FIG. 12 is a cross-sectional view of FIG. 11, taken along line 12—12 of FIG. 11, showing the resultant curvature at its point of least radius.
Figure 13:
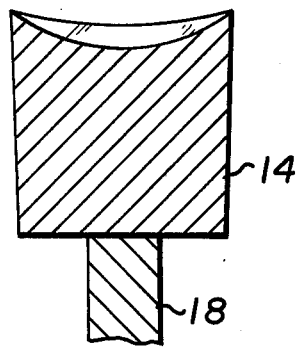
FIG. 13 is a cross-sectional schematic view of FIG. 11, taken along line 13—13, showing the resultant raking surface at an intermediate degree of curvature.
Figure 14:
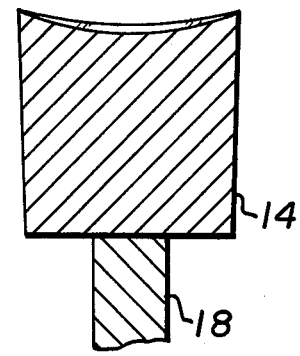
FIG. 14 is a cross-sectional schematic view, taken along line 14—14 of FIG. 11, showing the curvature of the resultant raking surface at its point of greatest radius.

The curvature of said surface is more fully shown in FIG. 11 which comprises a side schematic view of a cutting tooth illustrating the particular inverse half-conical curvature which is imparted to the raking surface. Therein, as is further detailed in FIGS. 12 through 14, it is seen that the edges 16 and 16' of the raking surface are accentuated in a manner which enhances the chip-free cutting characteristic of the saw tooth. Also, it is noted that, as the resultant surface of the cutting tooth merges into the gullet 18, a greater degree of curvature within the gullet 18 can be obtained, thereby increasing the total number of teeth which can be formed within a saw blade whose surfaces are ground through the use of the present inventive method.

Further, it is to be appreciated that the cutting demand upon a saw tooth decreases as the saw tooth merges into the gullet. According, the type of curvature produced as a result of the present inventive method maximizes the cutting surface at that part of the tooth where the greatest need for sharpness exists, while economizing in the amount of material ground away from the tooth in those areas where a lesser degree of cutting is required.

It is thus seen that an improved method of grinding concave teeth of a circular saw has been efficiently obtained through the above described procedures.

While there have been herein shown and described the preferred embodiments of the present invention, it will understood that the invention may be embodied otherwise than as herein specifically illustrated or described and that within said embodiments certain changes in the detail and construction, and the form of arrangement of the parts may be made without departing from the underlying idea of principles of this invention within the scope of the appended claims.

What is claimed is:

1. A method of grinding raking surfaces of the blade of a circular saw, comprising the steps of:
    (a) positioning a rotating frustoconical grinding element in movable relationship to a fixed plane of reference, such as a work bench;
    (b) positioning the major plane of the circular saw in a position which will permit a tangential approach of the frustoconical grinding element to the raking surfaces of the blade;
    (c) actuating the rotation of said frustoconical grinding element; and
    (d) placing said rotating grinding element into pressured engagement with the raking surface of one tooth of the circular saw whereby the frustoconical outer surface of said grinding element is displaced with respect to said raking surface so as to define an angle therebetween ranging from 2° to 10° and abrading said raking surface so as to form a concave configuration therein, said concave configuration having a graduated depth terminating at a maximum depth of 1/32 of an inch measured with respect to lateral, radially directed leading edges of said maximum depth defined at the outermost end of said tooth.

2. The method as recited in claim 1 in which said method further comprises the sequential progression of said raking surfaces with respect to the positon of said grinding element in order to ultimately obtain the grinding of every raking surface of said blade.

3. The method as recited in claim 2 in which said sequential progression is effectuated through the use of means for programmed machine control.

4. The method as recited in claim 2 in which said step of placing the said grinding element into abutment with said raking surface is effectuated through the use of means for programmed machine control.

* * * * *